US010506756B2

(12) United States Patent
Fanshier et al.

(10) Patent No.: US 10,506,756 B2
(45) Date of Patent: Dec. 17, 2019

(54) ROTATING TOOLBAR WITH DOUBLE ROD CYLINDER

(71) Applicant: AGCO Corporation, Duluth, GA (US)

(72) Inventors: Benjamin Anson Fanshier, Hesston, KS (US); Ross Duerksen, Hesston, KS (US); Douglas J. Grollmes, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 16/470,380

(22) PCT Filed: Nov. 22, 2017

(86) PCT No.: PCT/IB2017/001421
§ 371 (c)(1),
(2) Date: Jun. 17, 2019

(87) PCT Pub. No.: WO2018/109546
PCT Pub. Date: Jun. 21, 2018

(65) Prior Publication Data
US 2019/0327879 A1 Oct. 31, 2019

Related U.S. Application Data

(60) Provisional application No. 62/435,095, filed on Dec. 16, 2016.

(51) Int. Cl.
*A01B 73/00* (2006.01)
*A01B 63/32* (2006.01)
(Continued)

(52) U.S. Cl.
CPC ............. *A01B 73/04* (2013.01); *A01B 63/10* (2013.01); *A01B 63/22* (2013.01); *A01B 63/32* (2013.01)

(58) Field of Classification Search
CPC ....... A01B 73/04; A01B 73/06; A01B 73/048; A01B 63/10; A01B 63/22; A01B 63/32;
(Continued)

(56) References Cited

U.S. PATENT DOCUMENTS 4,825,958 A  5/1989 Kelderman
5,511,623 A  4/1996 Frasier
(Continued)

FOREIGN PATENT DOCUMENTS

AU  2010201330 A1  3/2011
EP  1859670 A1  11/2007
(Continued)

OTHER PUBLICATIONS

European Patent Office International Search Report for International Application No. PCT/IB2017/001421, dated Feb. 26, 2018.
(Continued)

*Primary Examiner* — Robert E Pezzuto

(57) ABSTRACT

In one embodiment, an implement comprising a center section and a pair of wing sections, each of the sections comprising a pair of parallel frame members pivotably coupled to each other, wherein one of the frame members comprises a toolbar; and a plurality of hydraulic cylinders enabling rotational movement between the parallel frame members, wherein the hydraulic cylinders of the wing sections comprise double rod cylinders and the hydraulic cylinders of the center section comprises single rod cylinders.

10 Claims, 12 Drawing Sheets

(51) Int. Cl.
*A01B 73/04* (2006.01)
*A01B 63/10* (2006.01)
*A01B 63/22* (2006.01)

(58) Field of Classification Search
CPC ..... A01B 63/28; A01B 61/046; A01B 23/043; A01B 19/04
USPC ..... 172/2–11, 310, 311, 452, 471, 140, 460, 172/488
See application file for complete search history.

(56) References Cited

U.S. PATENT DOCUMENTS

| | | | |
|---|---|---|---|
| 6,076,611 A | 6/2000 | Rozendaal et al. | |
| 6,112,827 A | 9/2000 | Reiber | |
| 8,567,517 B2* | 10/2013 | Friggstad | A01B 63/32 172/140 |
| 8,657,026 B2* | 2/2014 | Friesen | A01B 63/32 172/452 |
| 2002/0017090 A1 | 2/2002 | Hockenbeck | |
| 2002/0017389 A1 | 2/2002 | Moser et al. | |
| 2008/0093093 A1* | 4/2008 | Sheppard | A01B 61/046 172/2 |
| 2008/0308020 A1 | 12/2008 | Ryder et al. | |
| 2011/0120357 A1 | 5/2011 | Schilling et al. | |
| 2011/0284252 A1 | 11/2011 | Friggstad et al. | |
| 2011/0315410 A1 | 12/2011 | Kinzenbaw | |
| 2012/0298388 A1 | 11/2012 | Bauer | |
| 2014/0069670 A1 | 3/2014 | Friesen et al. | |
| 2014/0196996 A1 | 7/2014 | Ito et al. | |
| 2015/0156955 A1 | 6/2015 | Sudbrink et al. | |
| 2015/0230391 A1 | 8/2015 | Houck | |

FOREIGN PATENT DOCUMENTS

| | | |
|---|---|---|
| EP | 2 524 587 A1 | 11/2012 |
| WO | 2003/096785 A1 | 11/2003 |
| WO | 2014/066654 A1 | 5/2014 |

OTHER PUBLICATIONS

UK Intellectual Property Office, Search report for related UK Application No. GB 1700558.8, dated Jul. 5, 2017.

* cited by examiner

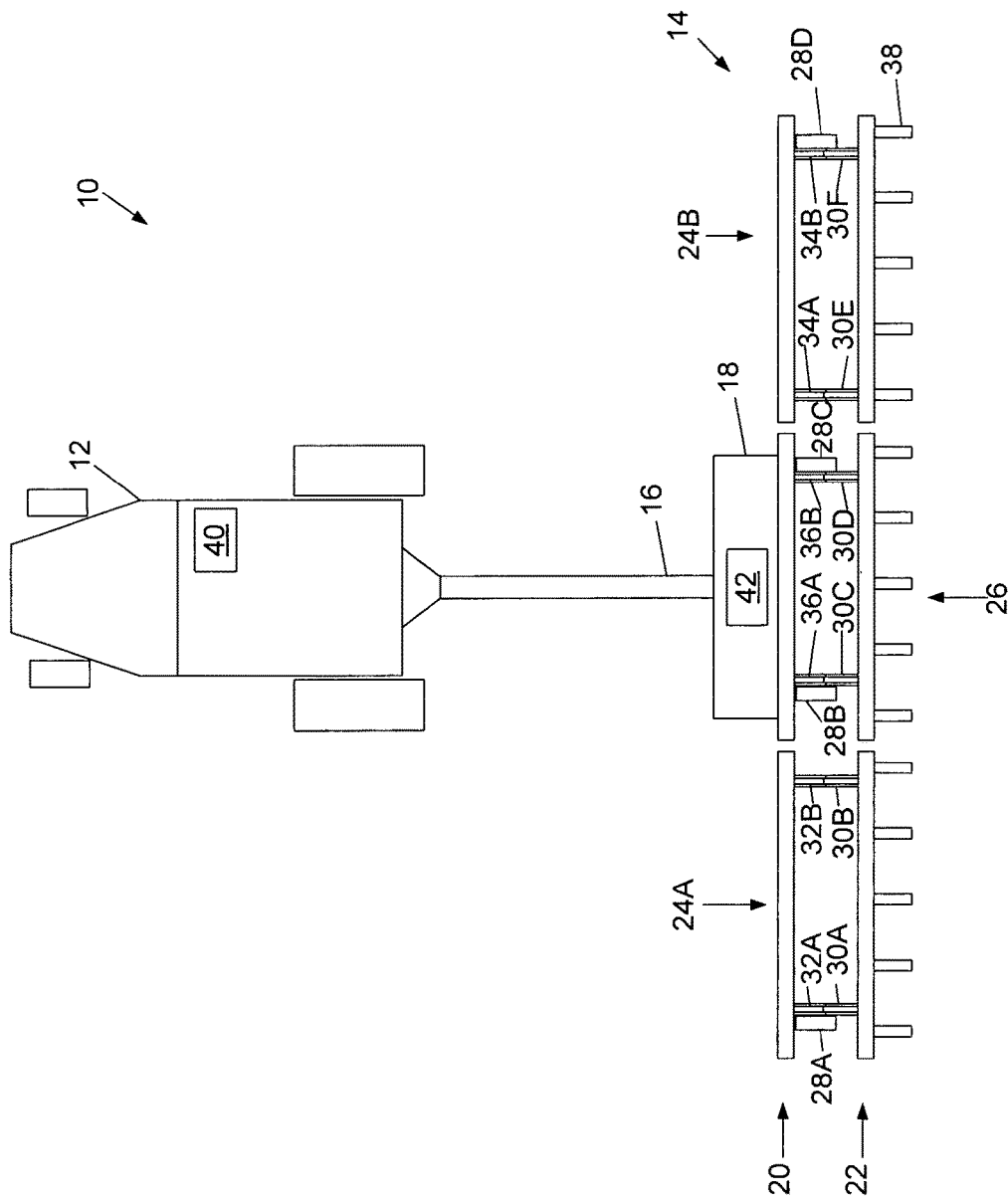

ROTATING TOOLBAR WITH DOUBLE ROD CYLINDER

CROSS REFERENCE TO RELATED APPLICATION

This application claims the benefit of U.S. Provisional Application No. 62/435,095 filed Dec. 16, 2016, which is hereby incorporated by reference in its entirety.

BACKGROUND

Technical Field

The present disclosure is generally related to implements, and, more particularly, agricultural implements.

Related Art

Implements, such as agricultural implements that are used with soil working tool attachments, typically use multiple hydraulic circuits to control field operations and a separate set of hydraulic circuits for transport operations. For instance, one set of hydraulic circuits is used to lower the soil working tool attachments (e.g., row units for seeding and/or agitating the soil) to the ground and another set is used to lift the implement, attachments, and wheels at headlands and to permit folding of the implement to narrow the profile for road travel. As implement size increases, enabling these basic functions comes at an increased cost and/or weight penalty.

BRIEF DESCRIPTION OF THE DRAWINGS

Many aspects of a rotating toolbar system of the present disclosure can be better understood with reference to the following drawings. The components in the drawings are not necessarily to scale, emphasis instead being placed upon clearly illustrating the principles of a rotating toolbar system. Moreover, in the drawings, like reference numerals designate corresponding parts throughout the several views.

FIG. 1 is a schematic diagram that illustrates an example environment in which an embodiment of an example rotating toolbar system may be used.

DESCRIPTION OF EXAMPLE EMBODIMENTS

Overview

Figure 2A:
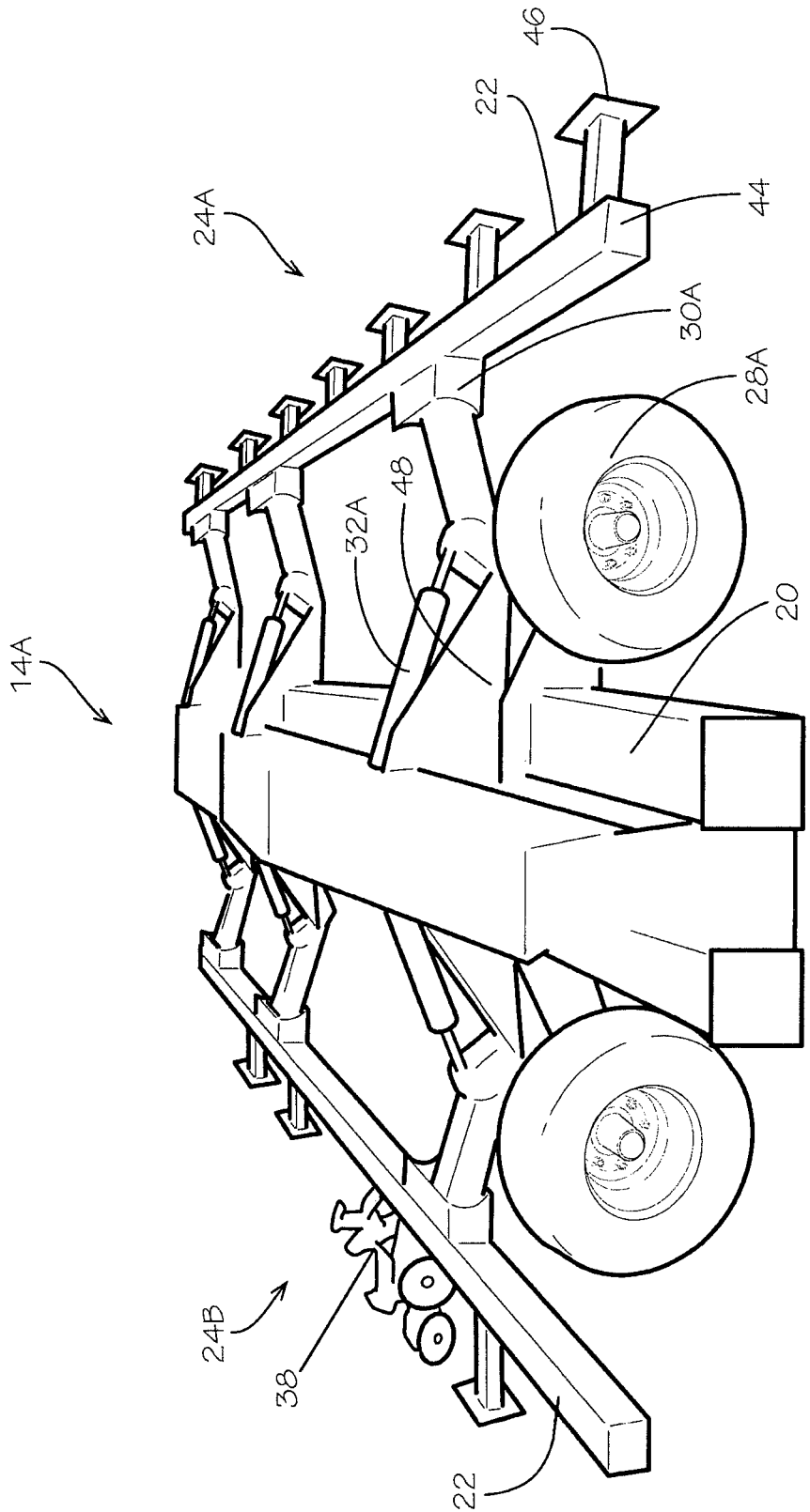
FIGS. 2A-2C are schematic diagrams that illustrate, using a folded configuration in side elevation view, an embodiment of an example rotating toolbar system in multiple operational positions.

In one embodiment, an implement comprising a center section and a pair of wing sections, each of the sections comprising a pair of parallel frame members pivotably coupled to each other, wherein one of the frame members comprises a toolbar; and a plurality of hydraulic cylinders enabling rotational movement between the parallel frame members, wherein the hydraulic cylinders of the wing sections comprise double rod cylinders and the hydraulic cylinders of the center section comprises single rod cylinders.

DETAILED DESCRIPTION

Certain embodiments of a rotating toolbar system and associated apparatus and method are disclosed that enable an implement to be positioned at multiple operational positions using a reduced set of hydraulic circuits. In one embodiment, a rotating toolbar system as disclosed herein uses double rod, two or more cavity hydraulic cylinders to handle implement movement needed for both field and road transport operations. In one embodiment, a rotating toolbar system comprises an implement having a center section and a pair of wing sections, the wing sections foldable relative to the center section. The individual sections are each comprised of parallel frame members that, when deployed for field operations, extend transversely to the direction of movement across the field and in fore and aft arrangement relative to each other, separated by plural wheels. The rearward frame members of the pair for each section each comprise a toolbar on which a plurality of soil working tools (e.g., row units) are attached. The toolbars for each section are pivotably rotated relative to the forward frame member, with the wing sections rotatable via double rod cylinders about multiple relative operational positions and the center section rotatable about a subset of those operational positions via single rod cylinders.

Digressing briefly, most implement designs (e.g., planters) use wheel module systems to lift the entire planter frame during field operations and narrow transport, which requires more power and heavier structures. This conventional system is used in addition to a separate hydraulic system for lifting the toolbars with the row units secured thereto (e.g., for soil engagement). By using double rod cylinders on the wing sections, lighter duty cylinders may be used since only the toolbars and coupled row units are lifted by the hydraulic circuits of the implement as opposed to the entire frame and wheels with all of the products secured thereto. That is, one (lower) rod side of each double rod cylinder used on the wing sections is used to lift the toolbar for headland turns while the other (higher or upper) rod end of each double rod cylinder is used to lift the toolbar all the way up for transport operations.

Having summarized various features of certain embodiments of a rotating toolbar system of the present disclosure, reference will now be made in detail to the detailed description of a rotating toolbar system as illustrated in the drawings. While the disclosure is described in connection with these drawings, there is no intent to limit it to the embodiment or embodiments disclosed herein. For instance, though emphasis is on towed implements, in some embodiments, implements integrated into a self-propelled machine may also be used. Further, although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of a rotating toolbar system as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the implement looking forwardly.

Attention is now directed to FIG. 1, which is a schematic diagram that illustrates an example environment 10 in which an embodiment of a rotating toolbar system may be used. It should be appreciated by one having ordinary skill in the art, in the context of the present disclosure, that the environment 10 depicted in FIG. 1 is merely illustrative of one example environment, and that in some embodiments, other environments may be used. The example environment 10 includes a towing vehicle 12, in this example a tractor, towing an implement 14. The tractor 12 and implement 14 are depicted in fragmentary view. In some embodiments, other types of towing vehicles, including self-propelled vehicles with an integrated implement (in lieu of a towed implement) or towing vehicles of other axle arrangements or other chassis configurations may be used, and hence are contemplated to be within the scope of the disclosure. The tractor 12 is coupled to the implement 14 using any known hitch and/or tongue assembly 16. The implement 14 may support equipment 18, which may include one or more product containers, control components, pumps, reservoirs, among other equipment used to dispense product and control functioning of the implement and/or its attachments. The implement 14 comprises a chassis that includes parallel frame members 20, 22 in fore and aft arrangement, respectively, when deployed (e.g., when the implement 14 is towed in the forward direction). In the depicted example, the implement 14 is extended in a transverse direction relative to the direction of field traversal. The implement 14 is segmented into wing sections 24 (e.g., 24A, 24B) and a center section 26 that supports the equipment 18 and trails directly behind the tractor 12. In some embodiments, the implement 14 may be towed in an orientation where the center section 26 is physically offset from the center of the tractor 12. Although not detailed in FIG. 1, the wing sections 24 are respectively coupled to the center section 26 in pivotal manner, enabling a folding in a plane occupied by the tractor 12 and implement 14 for narrow-profile transport. In some embodiments, the folding of the wings 24 may be achieved outside of the plane of the tractor 12 and implement 14 (e.g., folded upward above the plane and rearward). Coupled to the frame members 20 of the wing sections 24A, 24B and center section 26 are respective wheels 28 (e.g., 28A to frame member 20 of wing section 24A, 28B-28C to frame member 20 of center section 26, and 28D to frame member 20 of wing section 24B). Some embodiments of a rotating toolbar system may use additional wheels (e.g., in tandem, or otherwise) in the same or different positions, or arrange the wheels in different locations than shown. The wheels 28 are disposed between the frame members 20, 22. Each frame member 22 comprises bracket arms 30 (e.g., 30A-30F) that extend forwardly and are pivotably coupled (e.g., via hinged joint) to rearward extending bracket arms (bracket arm 48, as best shown in FIG. 2A) of the frame member 20.

Attached at the frame member 20 at a location corresponding to the bracket arms extending rearward from the frame member 20 and at bracket arms 30A, 30B of the wing section 24A are double rod hydraulic cylinders 32 (e.g., 32A, 32B), and attached to bracket arms 30E, 30F of wing section 24B (and frame member 20) are double rod hydraulic cylinders 34 (e.g., 34A, 34B). Attached to bracket arms 30C, 30D of the center section 26 (and frame member 20) are single rod hydraulic cylinders 36 (e.g., 36A, 36B). Note that the location and/or quantity of bracket arms 30 and/or hydraulic cylinders 32, 34, 36 depicted in FIG. 1 is for illustration of one embodiment, and that in some embodiments, different and/or additional quantities and/or locations may be used. The double rod hydraulic cylinders 32, 34 are configured to rotate the frame members 22 of the wing sections 24 to/from operational positions of zero (0) degrees, an intermediate angular position, and approximately 90 degrees relative to the horizontal plane of the frame members 20. In one embodiment, the intermediate angular position is an operational position of approximately 30 degrees (e.g., 28-30 degrees). In one embodiment, the intermediate angular position is approximately 20 degrees. In one embodiment, the intermediate angular position is approximately 40 degrees (e.g., 38-40 degrees). In one embodiment, the range of intermediate angular positions is approximately 20-40 degrees. The single rod hydraulic cylinders 36 are hydraulically coupled to the double rod hydraulic cylinders 32, 34, and are configured to rotate the frame member 22 of the center section 26 to operational positions that are a subset of those performed for the double rod hydraulic cylinders 32, 34, namely, zero (0) degrees and approximately 30 degrees (e.g., 20-40 degrees) relative to a horizontal plane of the frame member 20.

Note that in one embodiment, the amount of travel of the stroke of the bottom rod of the double rod hydraulic cylinders 32, 34 and for the single rod cylinders 32-36 limits the maximum travel to the intermediate angular positions, though in some embodiments, other cylinder designs may be used to change the amount of travel. Further, it is noted that in some embodiments, the amount of rotation, at the headlands for instance, may be pre-programmed (or in some embodiments, adjusted by an operator) to the lower end of the intermediate angular position. For instance, the intermediate angular position may be configured at 20 degrees, such as to achieve a minimum recommended ground clearance. In other words, the choice of maximum stroke may be to maximize ground clearance, and this value may be fixed by the manufacturer, or in some embodiments, operators may decide that a less than fully-retracted stroke is needed or warranted to accommodate ground clearance demands and hence given the ability to adjust accordingly. Note that operational positions refers to angular positions of a toolbar of the frame members 22 of the wing sections 24 relative to a plane of a transverse portion (e.g., drawbar) of the frame member 20 that extends the length of the frame member 20, where the angular position is sustained during an indeterminate period of time sufficient to perform one or more functions that includes working the soil (e.g., via row units that seed, fertilize, and/or agitate the soil), making turns (e.g., at headlands to achieve a subsequent pass of the worked field), and converting the implement configuration for road transport (e.g., narrow profile). Removeably attached to the frame members 22 and arranged rearward to (and in some embodiments, slightly forward of, such as in a fore-and-aft staggered configuration) the frame members 22 are soil working tools, including row units that seed, fertilize, and/or agitate the soil.

The tractor 12 also comprises a controller 40 that converts operator or device-driven instructions to commands, and also performs control and management functions for the tractor 12 and/or implement 14. Hydraulic fluid control may be achieved via a control component 42 that comprises one or more manifolds of respective one or more control valves that control a state of the double rod hydraulic cylinders 32, 34 and single rod hydraulic cylinders 36 (e.g., control the change in pressure and/or change in flow rate of hydraulic fluid through the cylinders). Actuation of the control component 42 may be achieved wirelessly or via wired connection (e.g., Isobus) according to commands from the controller 40.

Note that the rotating toolbar system may include the components described for the entire environment 10 in some embodiments, or a subset of the described components in some embodiments.

Figure 2B:
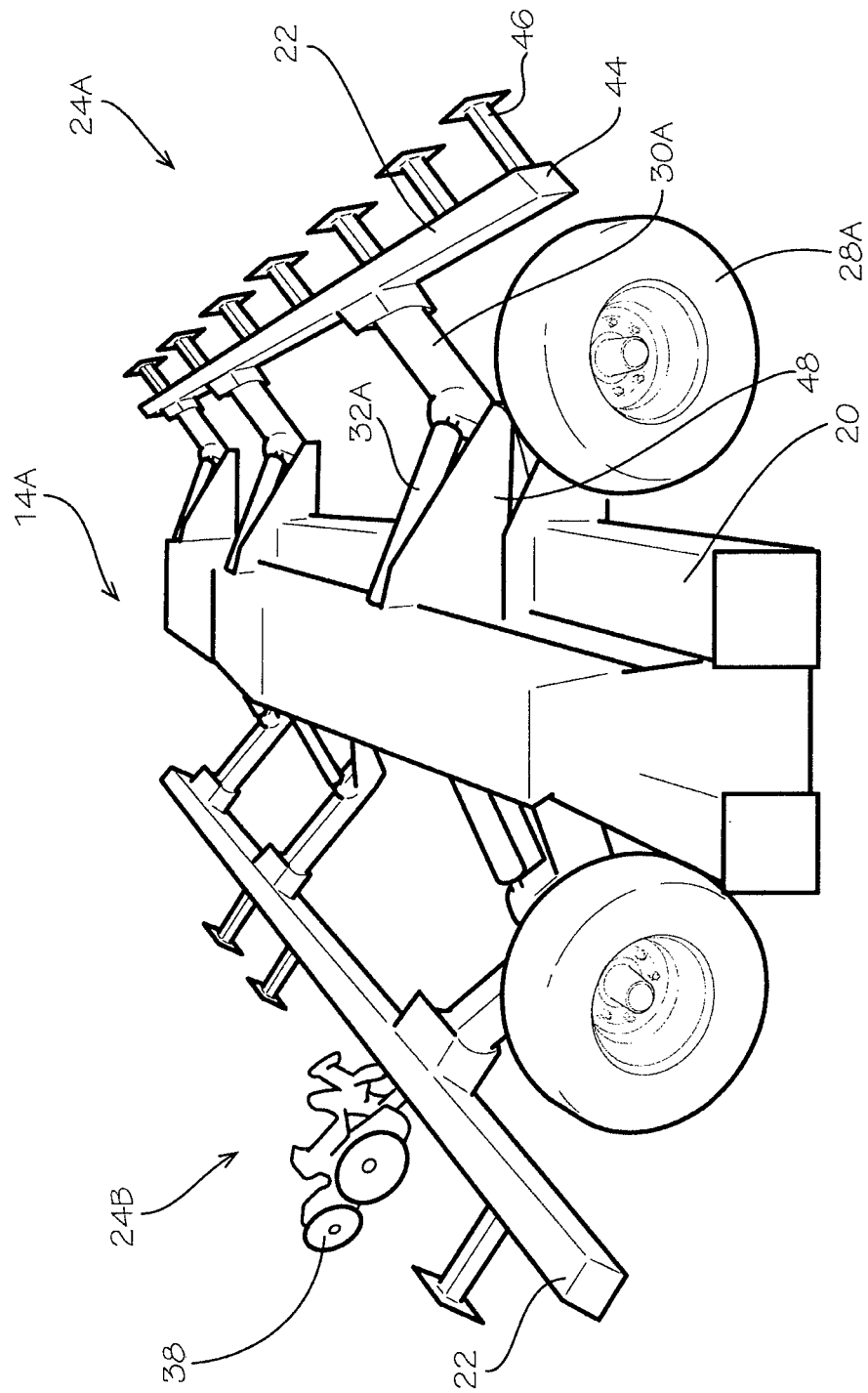
Figure 2C:
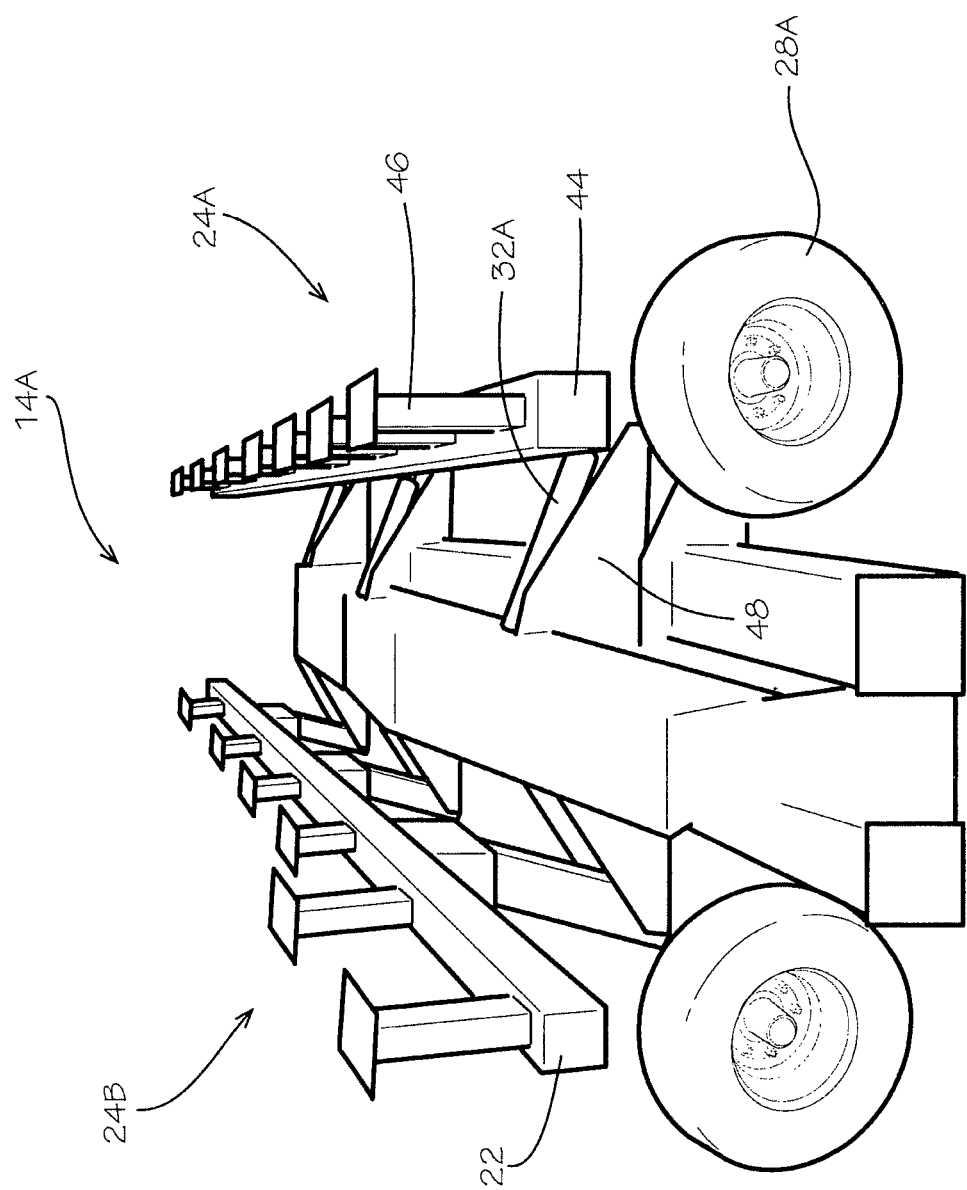

Having generally described an example environment 10 in which an embodiment of a rotating toolbar system may be used, attention is directed to FIGS. 2A-2C, which illustrate example operational positions for the wing sections of an implement 14A of an embodiment of a rotating toolbar system. In the examples of FIGS. 2A-2C, the implement 14A (and likewise 14B in FIGS. 3A-3C) may be configured similar (e.g., excepting quantity of components) to the implement 14 of FIG. 1, where in the depicted example of FIGS. 2A-2C, the wing sections 24A, 24B are folded forward relative to the center section 26. Only one row unit 38 is depicted as attached to the frame member 22, with the understanding that additional row units would typically be attached along the frame members 22. Referring to wing section 24A in particular with primary focus on the components associated with the double rod hydraulic cylinder 32A, with the understanding that a similar description applies to the rotational components of the rest of the wing section 24A and the wing section 24B but omitted here for brevity, the frame member 22 comprises a toolbar 44. The toolbar 44 may be rectangular in shape, and in one example embodiment, comprises on the rearward side, tool brackets 46 that are uniformly spaced along the toolbar 44. The tool brackets 46 are secured to the toolbar 44 according to any known securement mechanism, including weld, bolts, etc. The tool brackets 46 enable attachment of respective soil working tools, such as row units 38, though in some embodiments, other coupling structures may be used. On the opposing side of the toolbar 44 are the bracket arms 30, which extend forwardly from the toolbar 44. The bracket arms 30 couple via a hinged joint to rearward extending bracket arms 48 extending from the frame member 20.

Enabling rotation of the frame members 20, 22 are the plural double rod hydraulic cylinders 32 (e.g., 32A). In one embodiment, the double rod hydraulic cylinder 32A (as with the other double rod hydraulic cylinders 32) is attached to an upper portion of the frame member 20 (as part of, or proximal to, the bracket arm 48) and a portion of the bracket arm 30 opposite the toolbar 44. In FIG. 2A, the double rod hydraulic cylinders 32 have rotated the toolbar 44 to a zero (0) degree angle relative to the horizontal plane of a transverse component of the frame member 20. In this orientation, row units (not shown) may be operational and working (e.g., seeding, agitating, etc.) the soil. Note that the toolbar 44 of the center section 26, though not shown, is also orientated the same via actuation of the single rod hydraulic cylinders 36 (FIG. 1).

In FIG. 2B, the double rod hydraulic cylinders 32 have rotated the toolbar to an intermediate angular position (e.g., approximately 30-40 degrees). For purposes of brevity, an intermediate angular position of 30 degrees relative to the horizontal plane of the frame member 20 will be used, with the understanding that the intermediate angular position may be of other values within the range of approximately 20-40 degrees. The lower rod ends of the double rod hydraulic cylinders 32, 34 are fully or about fully retracted at this rotational position. In one embodiment, the rotation occurs in unison among the toolbar rotation of the wing section 24B (and in unison with the toolbar rotation of the center section 26 via actuation of the single rod hydraulic cylinders 36). In this orientation, the row units may be lifted from the ground at headlands to facilitate turning of the implement for the next pass or to prepare for road transport.

Referring to FIG. 2C, the double rod hydraulic cylinders 32 have rotated the toolbar approximately ninety (90) degrees relative to the horizontal plane of the frame member 20 due to the combination of the fully-retracted strokes of the lower rod ends and higher rod ends of the double rod hydraulic cylinders 32, 34. In one embodiment, the rotation occurs in unison among the toolbar rotation of the wing section 24B. Note that the toolbar rotation of the center section 26 does not go beyond the approximately 30 degree rotation as the single rod hydraulic cylinders 36 are fully retracted in one embodiment at approximately 30 degrees. Rather, as explained below, the control component 42 (FIG. 1) causes the single rod hydraulic cylinders 36 to remain fixed while permitting the double rod hydraulic cylinders 32, 34 to use the additional (higher) rod end to enable the further rotation to approximately 90 degrees.

Figure 3A:
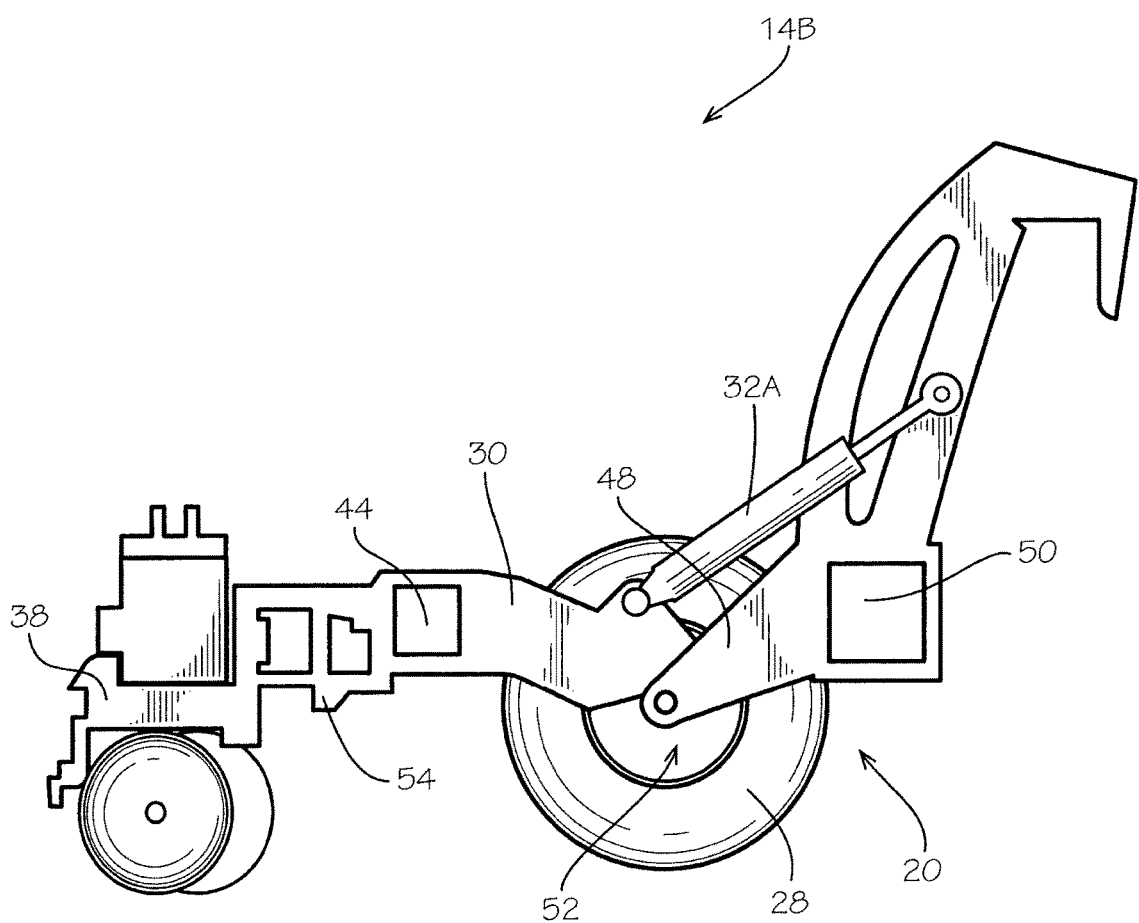
FIGS. 3A-3C are schematic diagrams that illustrate, using a portion of an implement with a single tool attachment shown in side elevation view, an embodiment of an example rotating toolbar system in multiple operational positions.
Figure 3B:
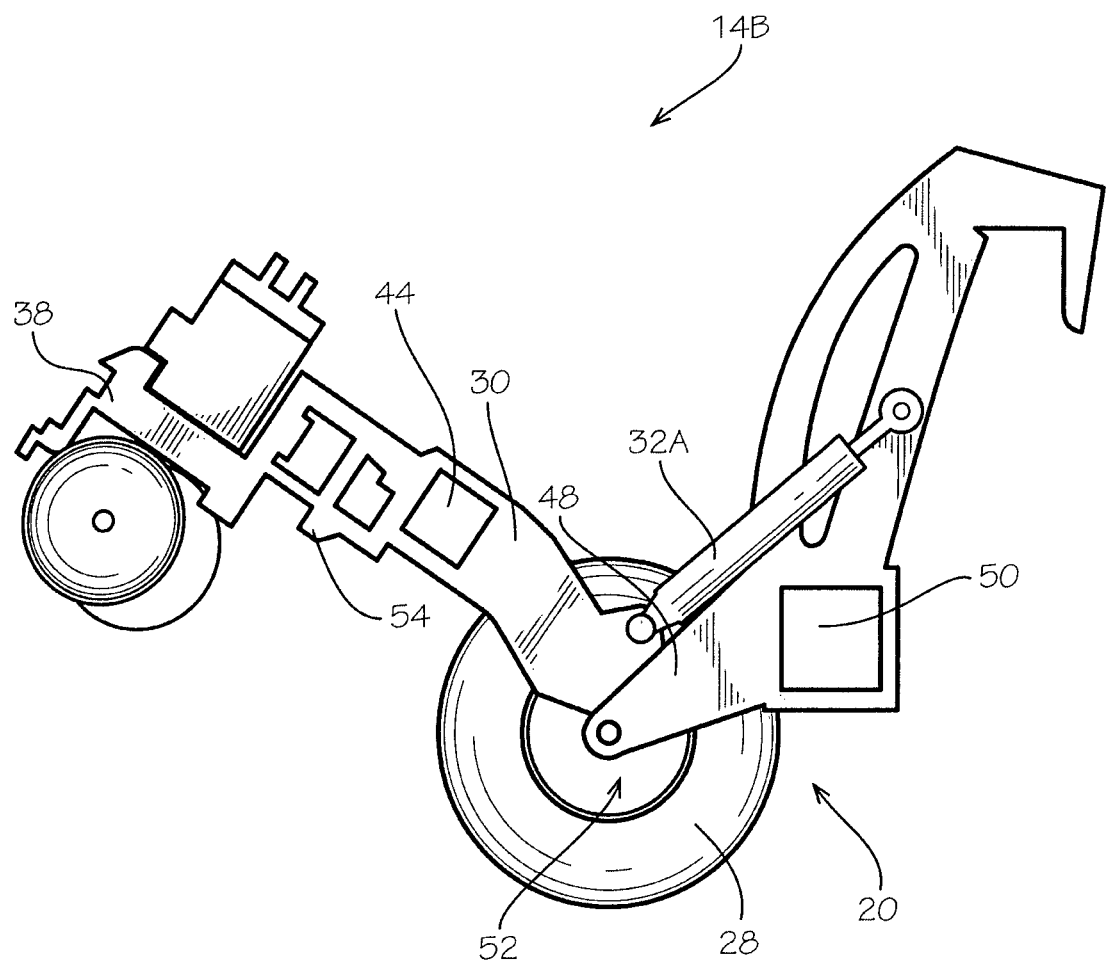
Figure 3C:
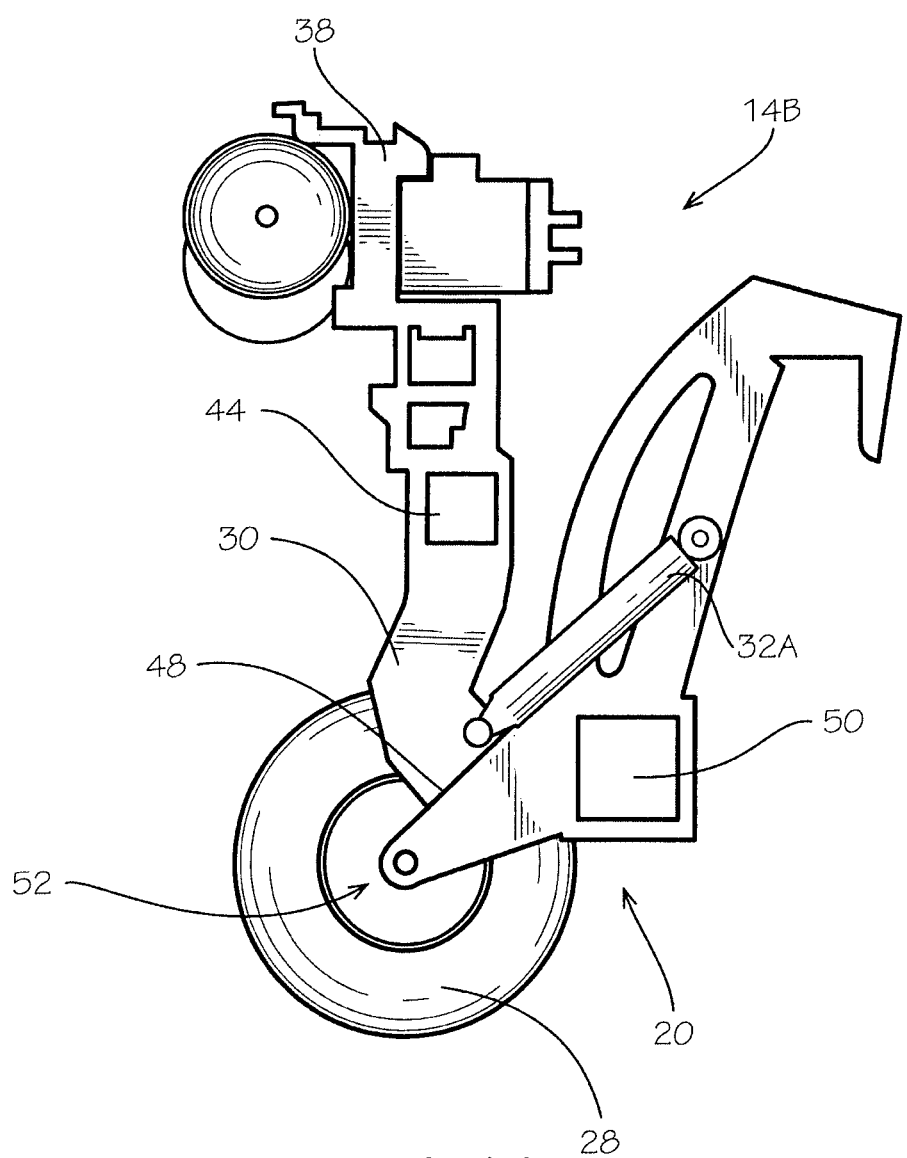

Referring to FIGS. 3A-3C, shown are singular portions of an implement 14B that illustrate the rotation of the toolbar 44 of the frame member 22 relative to the frame member 20. The implement 14B may be configured similarly to the implements 14 (FIG. 1) and 14A (FIG. 2A). The illustrations are shown in side elevation view (looking away from the center section 26 (FIG. 1)) proximal to the wheel 28. From right (front) to left (back) in respective FIGS. 3A-3C, the (front) frame member 20 is shown, and includes a transversely extending drawbar 50 that in one embodiment is rectangular in form. Reference to angular positions are made with reference to a horizontal plane running through the center of the drawbar 50, the plane represented by a dashed line. Other reference points may be used, the purpose merely to illustrate the rotational change. The frame member 20 further comprises a bracket arm 48 extending rearwardly from the drawbar 50, and in one embodiment, is coupled to a hub of the wheel 28 and also pivotably coupled at hinge point 52 to the bracket arm 30 of the (rear) frame member 22. The bracket arm 30 extends forwardly from the toolbar 44. The frame member 22 further comprises tool brackets (best shown in FIG. 2A, tool bracket 46), to which the row unit 38 attaches via parallel links 54. Operationally, the double rod hydraulic cylinder 32A is coupled between the frame member 20 and the bracket arm 30 of the frame member 22 in a position proximal to (e.g., coincident with) the bracket arms 30, 48.

As shown in FIG. 3A, the double rod hydraulic cylinder 32A rotates the toolbar 44 relative to the frame member 20 (e.g., horizontal plane of the drawbar 50) to approximately zero (0) degrees, enabling the functionality of the row unit 38 to be put into effect.

Referring to FIG. 3B, the double rod hydraulic cylinder 32A rotates the toolbar 44 relative to the frame member 20 (e.g., horizontal plane of the drawbar 50) to an intermediate angular position according to a maximum stroke (full retraction, though as described above, some implementations may be operator-configured or otherwise pre-programmed for less than full retraction) of the lower rod end of the double rod hydraulic cylinder 32A, facilitating the maneuvering of the implement 14B at headlands.

Referring to FIG. 3C, the double rod hydraulic cylinder 32A rotates the toolbar 44 relative to the frame member 20 (e.g., horizontal plane of the drawbar 50) to approximately ninety (90) degrees due to the combination of lower and upper rod end, fully-retracted strokes of the double rod hydraulic cylinder 32A, facilitating the configuration of the implement 14B for transport without the need for lifting the frame.

Figure 4A:
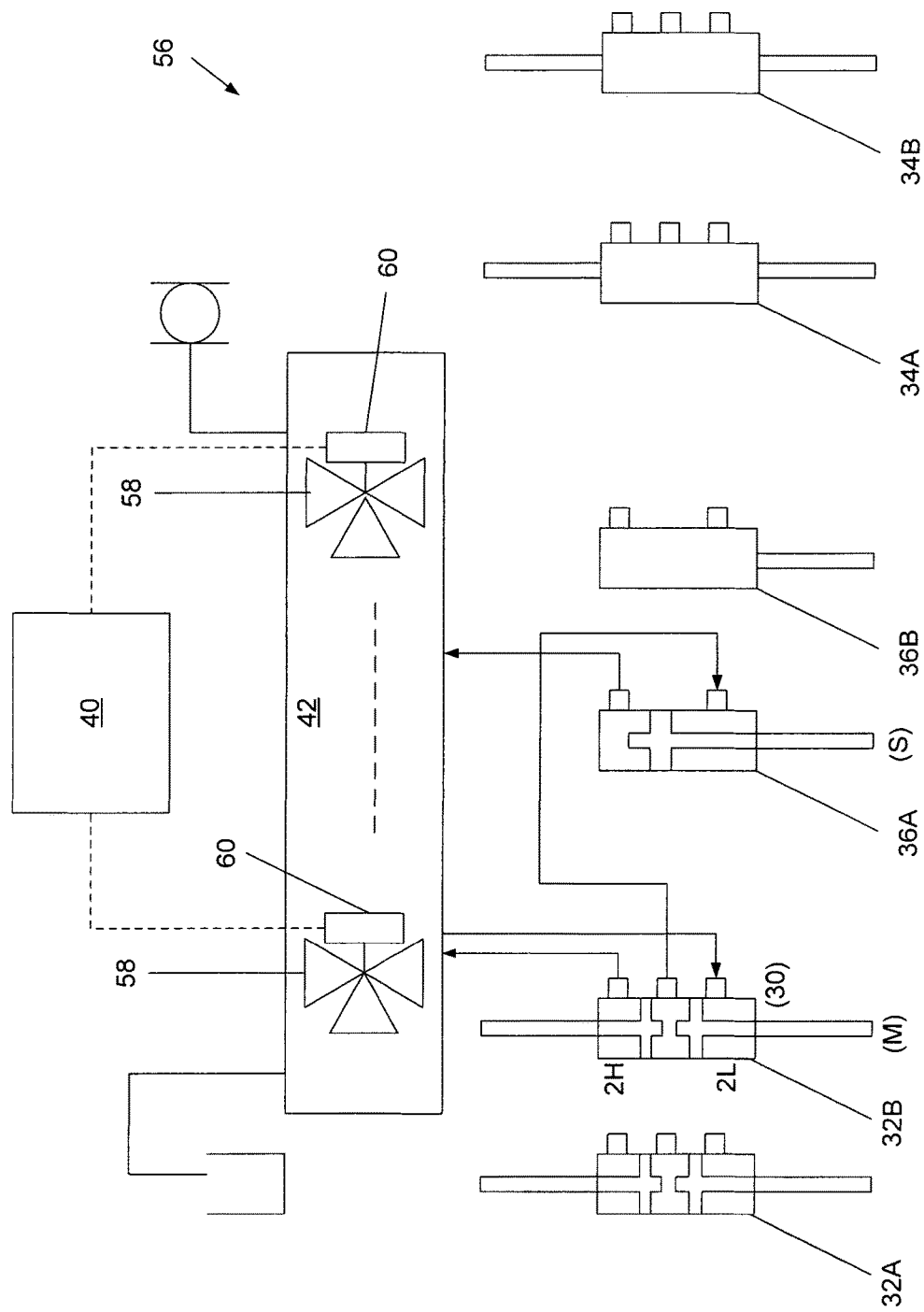
FIGS. 4A-4B are schematic diagrams that illustrate an example hydraulic circuit used to actuate the hydraulic cylinders of an embodiment of an example rotating toolbar system.
Figure 4B:
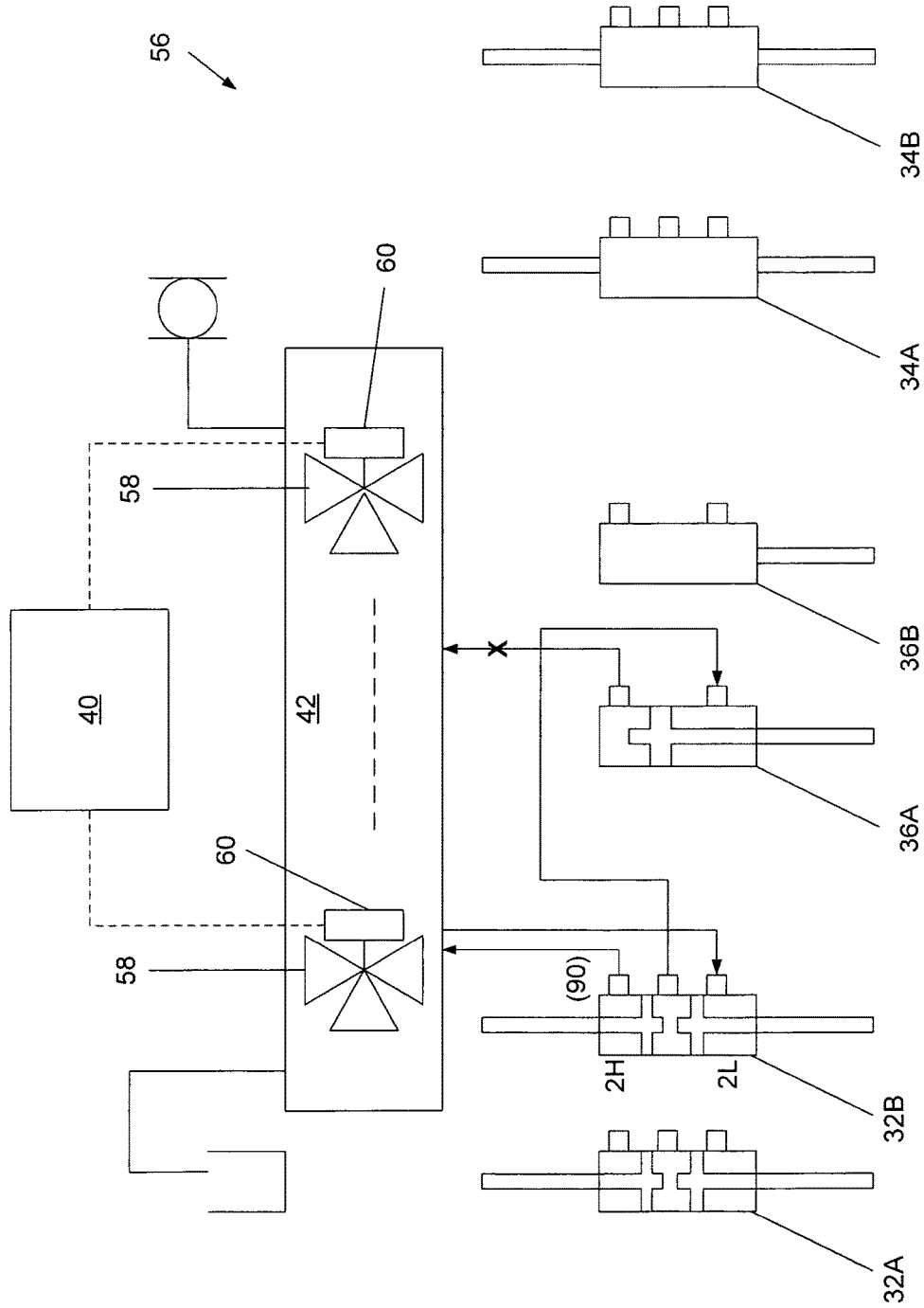

Attention is now directed to FIGS. 4A-4B, which illustrate an example hydraulic circuit 56 used to actuate the hydraulic cylinders of an embodiment of an example rotating toolbar system. It should be appreciated by one having ordinary skill in the art in the context of the present disclosure that variations to the hydraulic circuit 56 may be made as long as the functionality of actuating the double rod hydraulic cylinders 32, 34 and the single rod hydraulic cylinders 36 achieves the same or similar effect. The hydraulic circuit 56 comprises the control component 42, the double rod hydraulic cylinders 32, 34, and the single rod hydraulic cylinders 36, as well as the conduits (e.g., tubing, hoses, etc.) used to interconnect the components and a source of pressure differential (e.g., pump) and reservoir. In one embodiment, the control component 42 comprises a manifold that comprises one or more control valves 58, as is known. Each of the control valves 58 comprises a valve body, a flow-regulating component (e.g., paddle, disc, ball, globe, etc.), and a poppet or spool that serves as an interface between the flow-regulating component and a controller 60. The controller 60 may be a solenoid, motor, control card, switch, relay, etc. The controller 60 is in communication directly or indirectly (e.g., through other components or another controller) with the controller 40. The communication may be achieved wirelessly or via a wired connection, and is represented by finely-incremented dashed lines in FIGS. 4A-4B. Though described as electronic control, in some embodiments, control of the control valves 58 may be achieved via pneumatic control or otherwise. The control valves 58 are fluidly coupled to the double rod hydraulic cylinders 32, 34 and the single rod hydraulic cylinders 36, as represented by the solid line connections. In one embodiment, the control valves 58 may be multi-position valves (e.g., three-position valves). The fluid connections may be achieved via one or more conduits, as described above.

As is known, and referring to the double rod hydraulic cylinder 32B (with similar description applicable for the other double rod hydraulic cylinders 32A, 34), the double rod hydraulic cylinder 32B comprises three ports corresponding to three cavities (the middle cavity is open, though in some embodiments, may be a separate, closed cavity) within the housing of the double rod hydraulic cylinder 32B. In other words, for the three (3) port design depicted for the double rod hydraulic cylinder 32B, the center cavity is shared between the upper or higher rod end (e.g., for approximately 30-90 degree travel) and the lower rod end (e.g., for anywhere between 0-30 degree travel, as desired). As indicated above, ranges involving other values for the intermediate angular position may be used. In some embodiments, the double rod hydraulic cylinder 32B may have a separated-out or divided central cavity where the external manifestation of the central port depicted in FIGS. 4A-4B is replaced with two ports, resulting in a four (4) port design for the double rod hydraulic cylinder. That is, by using a 4-port design, functionality of the upper and lower rods of the double rod hydraulic cylinder is completely separate, eliminating or mitigating the risk of cross-talk among the two hydraulic functions of the upper and lower rods yet at the cost of additional hydraulic components. The rods at each end of the double rod hydraulic cylinder 32B extend and retract (and hold position) depending on a state (e.g., as manifested as a pressure or flow rate value) of the double rod hydraulic cylinder 32B. For instances, changes in flow through the ports and/or changes in pressure differential across the corresponding pistons within the double rod hydraulic cylinder 32B, correspond to the changes in state. As explained above, one rod side (2L or 2-lower) of the double rod hydraulic cylinder 32B is used for headland turns (e.g., rotating the toolbar 44 (FIG. 2A) to an intermediate angular position at maximum or almost maximum stroke), whereas the other rod side of the double rod hydraulic cylinder (2H or 2-higher) is used, in combination with the retracted stroke of the lower rod end, to rotate the toolbar 44 all the way up (e.g., approximately 90 degrees) for transport.

The cylinders are arranged, from left to right in FIGS. 4A-4B, according to two double rod hydraulic cylinders 32A, 32B for the wing section 24A (FIG. 1), followed in the center section 26 (FIG. 1) with two single rod hydraulic cylinders 36A, 36B, followed in the wing section 24B with two double rod hydraulic cylinders 34A, 34B. Note that in some embodiments, a different quantity of cylinders for each section may be used. Referring again to the cylinders of the wing section 24A and half of the center section 26 (with similar description applicable for the other half of the center section 26 and the wing section 24B), the 2H port and the 2L port are coupled to the control valve 58 to enable the stroke (fully retracted) of the 2H rod to combine with the stroke (fully retracted) of the 2L rod (for 90 degree rotation), and to also enable independent control (e.g., stroke of the 2L rod to operate independently of the 2H rod to enable an initial maximum rotation to an intermediate angular position (e.g., 30 degrees)). The middle port of the double rod hydraulic cylinder 32B adjacent the single rod hydraulic cylinder 36A is coupled to one of the ports of the single rod hydraulic cylinder 36A, with the other port of the single rod hydraulic cylinder 36A coupled to the control valve 58. The stroke of the 2L rod of the double rod hydraulic cylinder 32B, via connection to one of the ports of the single rod hydraulic cylinder 36A, is the same as the stroke for the piston for the adjacent single rod hydraulic cylinder 36A, enabling rotation from the same position and serving as a mechanical stop. That is, the single rod hydraulic cylinder 36A (designated with an "S" for slave) and the double rod hydraulic cylinder 32B (designated with an "M" for master) are plumbed together in a master-slave configuration wherein the independence of the upper rod stroke (e.g., approximately 30-90 degrees) for the double rod hydraulic cylinder 32B cannot move independent of the stroke of the single rod hydraulic cylinder 36A until the lower rod and single rod are fully retracted. Accordingly, in one example implementation, from a headland angle (e.g., approximately 20-30 degrees), once the lower rod of the double rod hydraulic cylinder 32B and the single rod hydraulic cylinder are fully retracted, the upper rod of the double rod hydraulic cylinder 32B can operate independently to stroke to a fully retracted position of approximately 90 degrees. Note that in some embodiments, the double rod hydraulic cylinder 32B may be slightly less than full retraction and still be configured to commence retraction operations to approximately 90 degrees (of course after full retracting the lower rod to actually reach approximately 90 degrees, since it is the combination of the retracted lower (L) and higher (H) rods that enable achievement of the 90 degrees).

As to the mechanical stopping function described above, although there is independence in toolbar movement from the center 26 (FIG. 1) and wing sections 24 (FIG. 1) for narrow transport, in field operations (e.g., including headland turning), the center and wing section toolbars 22 (FIG. 1) are raised and lowered in unison or substantially in unison (e.g., at the same or similar rate to the same height). In transport mode of operations, the center section toolbar 22 is raised to a maximum of approximately 30 degrees, at or around which the center toolbar 22 and its associated attachments mechanically interfere with other planter space claims. Likewise, the wing section toolbars 44 (FIG. 2A) are also raised in the transport mode with the center section toolbar 22, and then further rotation of the wing section toolbars 44 to approximately 90 is achieved. According to the master-slave configuration, the toolbars 22 of the center 26 and wing sections 24 raise concurrently (at approximately the same rate) to the maximum rotation of the intermediate angular position. In practice, one example operation in the commencement and fulfillment of transport mode operation is that the wing and center section toolbars 22 are raised in unison to approximately 20 degrees (to achieve a minimum ground clearance for the attached row units), after which the wing sections 24 are folded forward. Then, the balance of the retraction of the single rod hydraulic cylinders 36 and lower rod end of the double rod hydraulic cylinders 32, 34 is implemented where the center section toolbar 22 reaches its mechanical stop as explained above. Then, the upper rod stroke of the double rod hydraulic cylinders 32, 34 combines with the full retraction of the lower rod ends to achieve an approximately 90 degree rotation of the toolbars 44 of the wing sections 24 (again, raised in unison). Once completed, the hitch 16 (FIG. 1) raises the front of the folded implement wings with the rigid mounted wheels in known manner. In effect, the mechanical stop is achieved via the full retracted states of the single rod hydraulic cylinders 36 and the double rod hydraulic cylinders 32, 34.

In one example operation (and again, viewing the cylinders from the wing section 24A and half of the center section 26, with similar and in one embodiment, simultaneous operation for the other half of center section 26 and wing section 24B), an input signal received at the controller 40 triggers control signals to be communicated by the controller 40 to the control component 42, and in particular, the controller 60 of the control valve 58. The input to the controller 40 may be operator input in one embodiment, be preprogrammed and hence from software, or a signal from a device triggered based on detection of a turn or location. For instance, the operator may select (or command verbally for voice activated user interfaces) a button, switch, or other user interface when the tractor 12 (FIG. 1) is approaching a headland and desires to raise the toolbar 44 (FIG. 2A). As another example, global navigation satellite systems (GNSS) functionality on the tractor 12 (or implement 14) may detect a headland (e.g., based on comparison of detected coordinates to an internally stored map of topology features) and signal to the controller 40 to commence the rotation of the toolbar 44 based on a data structure of commands corresponding to those locations. The control valve 58 in turn is actuated based on the signal from the controller 40, which in turn enables a change in state of the double rod hydraulic cylinders 32A, 32B and the single rod hydraulic cylinder 36A. For instance, the change in state may be manifested as a change in fluid flow to the 2L port of the double rod hydraulic cylinder 32B (and the 2L port of the double rod hydraulic cylinder 32A). The change in fluid flow is transferred from the middle port of the double rod hydraulic cylinder 32B to one of the ports of the single rod hydraulic cylinder 36A, causing all of the cylinders 32A, 32B, and 36A to change state (e.g., actuate) in unison (or substantially in unison), which in turn causes rotation of a coupled toolbar (e.g., toolbar 44) to a maximum of approximately 30 degrees (or other programmed or user-inputted maximum intermediate angular positions as described above).

Referring to FIG. 4B, upon input to the controller 40 (e.g., user input or otherwise a device indicating the need for transition to low-profile road transport), the controller 40 signals the control valve 58, which changes configuration or the control valve 58. The changed configuration of the control valve 58 results in retention of the force on the single rod hydraulic cylinder 36A (e.g., rod stroke is retained at the intermediate angular position). In particular, the control valve 58 shuts off fluid flow through the single rod hydraulic cylinder 36A (e.g., a changed state), yet enables a change in state via a change in fluid flow through the 2H port of the double rod hydraulic cylinders 32A and 32B. The actuation of the double rod hydraulic cylinders 32A, 32B results in a rotation of the toolbar 44 (FIG. 2A) approximately 90 degrees (based on the combination of the fully-retracted states of the double rod hydraulic cylinders 32, 34), enabling a low-profile transport configuration for the frame members 20, 22 (FIG. 1) without the need for independent systems (for frame raising and toolbar raising, respectively) and the concomitant additional hydraulic circuitry and associated costs and weight additions. In other words, toolbar rotation (without the need for wing wheel lifts as found in conventional systems) and transport mode have been combined using a single hydraulic circuit 56 with built-in mechanical stops. That is, the frame member 20 (FIG. 1) remains at the same height throughout operations in the field, unlike conventional systems, obviating the need for heavy duty cylinders and/or reducing the quantity of cylinders. Also noteworthy is that operation of the center section cylinders is according to operations at the wing section cylinders (e.g., a master-slave mechanism of control). In some embodiments, additional electronic controls (e.g., sensors) may be used to enable more sophisticated control (e.g., peer-to-peer control).

Figure 5A:
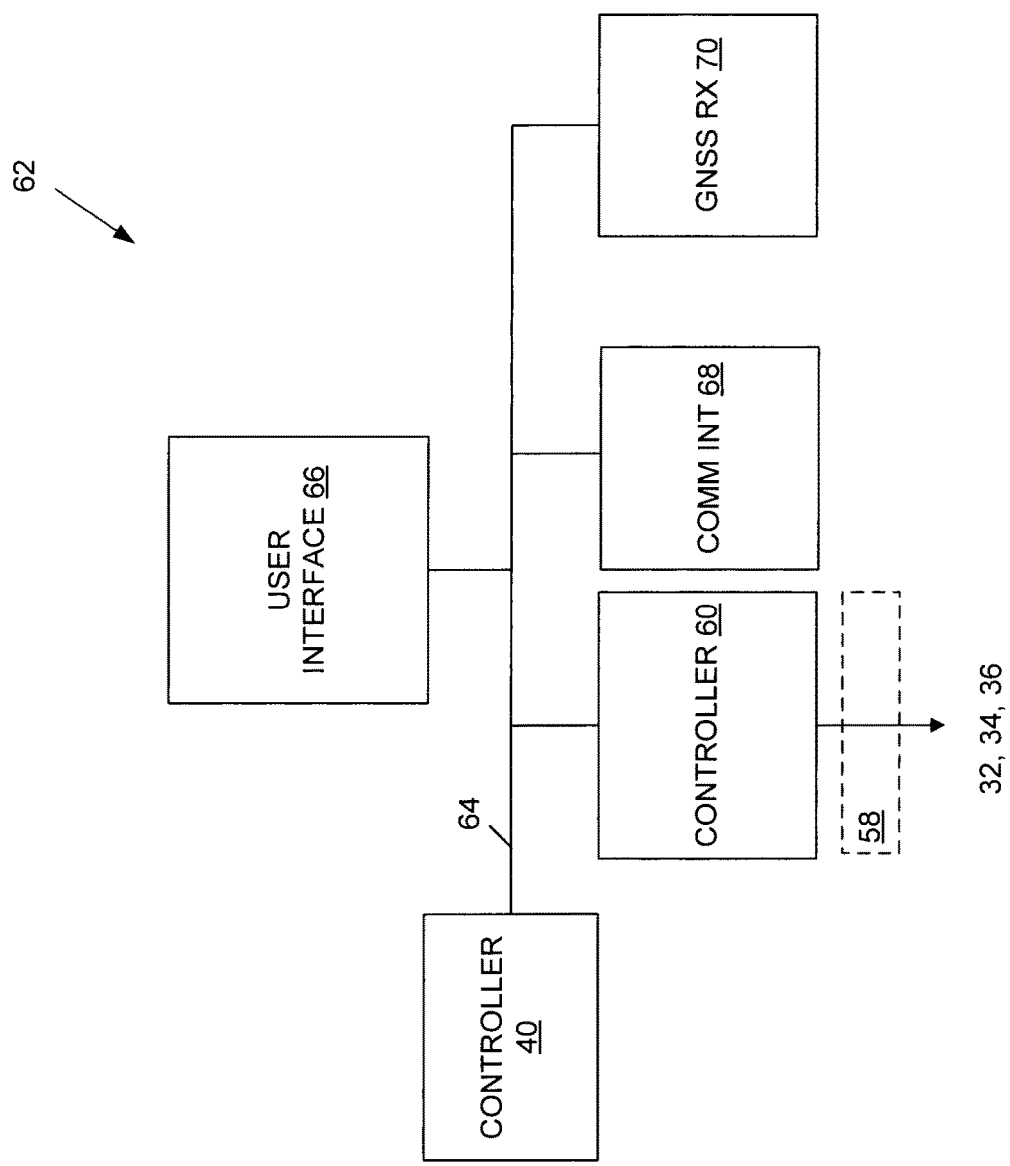
FIG. 5A is a block diagram that illustrates an example control system for an embodiment of an example rotating toolbar system.

Reference is now made to FIG. 5A, which illustrates an embodiment of an example control system 62 used for serving as a control interface between operator, program-driven, and/or device-driven commands and actuation of the hydraulic cylinders of the hydraulic circuit 56 (FIG. 4A). It should be appreciated within the context of the present disclosure that some embodiments may include additional components or fewer or different components, and that the example depicted in FIG. 5A is merely illustrative of one embodiment among others. The control system 62 may be located entirely on the implement (e.g., implement 14, FIG. 1), distributed among the towing vehicle (e.g., tractor 12, FIG. 1) and the implement, or among additional devices (e.g., remote control). Further, though depicted using a single controller 40, in some embodiments, the control system 62 may be comprised of plural controllers similarly configured to controller 40. In the depicted embodiment, the controller 40 is coupled via one or more networks, such as network 64 (e.g., a CAN network or other network, such as a network in conformance to the ISO 11783 standard, also referred to as "Isobus"), to the controller 60 (e.g., of control component 42, FIG. 4A), and a user interface 66. In some embodiments, the control system 62 may include additional components, including a communications interface 68 and a GNSS receiver 70 coupled via the network 64. Note that control system operations are primarily disclosed herein in the context of control via the single controller 40, with the understanding that additional controllers may be involved in one or more of the disclosed functionality in some embodiments.

The controller 60, as explained above, comprises components used to control operations of one or more control valves 58, and includes a solenoid, motor, and/or other control circuitry used to actuate the spool or poppet(s) of the control valves 58. The controller 60 may receive signaling over the network 64 from the controller 40, and responsively, actuate the valve(s) 58. In some embodiments, the controller 60 may comprise an electric or electromagnetic or magnetic actuator, or a pneumatic actuator in some embodiments.

The user interface 66 may include one or more components, including one or any combination of a keyboard, mouse, microphone, touch-type or non-touch-type display device (e.g., display monitor or screen), joystick, steering wheel, FNR lever, and/or other devices (e.g., switches, immersive head set, etc.) that enable input and/or output by an operator. For instance, in some embodiments, the user interface 66 may be used to present on a display screen implement control options (e.g., raise for headlands, raise for transport, etc.) for the operator to choose from, or the user interface 66 may provide feedback of when these actions are taken or about to be taken when performed automatically (e.g., providing an operator the opportunity to reject or acknowledge). In some embodiments, the functions of rotating the toolbar 44 (e.g., FIG. 2A) to the various operational positions may be performed via actuation of a switch, lever, handle, etc., or verbally commanded.

The communications interface 68 may comprise a wireless network interface module (e.g., including an RF and/or cellular modem) for wireless communication among other devices of the towing vehicle/implement combination or with remote devices (e.g., external from the implement and towing vehicle). The communications interface 68 (COMM INT in FIG. 5A) may work in conjunction with communication software (e.g., including browser software) in the controller 40, or as part of another controller coupled to the network 64 and dedicated as a gateway for wireless communications to and from the network 64. The communications interface 68 may comprise MAC and PHY components (e.g., radio circuitry, including transceivers, antennas, etc.), as should be appreciated by one having ordinary skill in the art.

The GNSS receiver (GNSS RX) 70 may be comprised of a GPS receiver, for instance, to receive location coordinates of the towing vehicle and/or implement. The GNSS receiver 70 may function in cooperation with field maps stored locally in the controller 40 (or accessed from a remote server) to enable detection of headlands, roads, field entrances, etc.

Figure 5B:
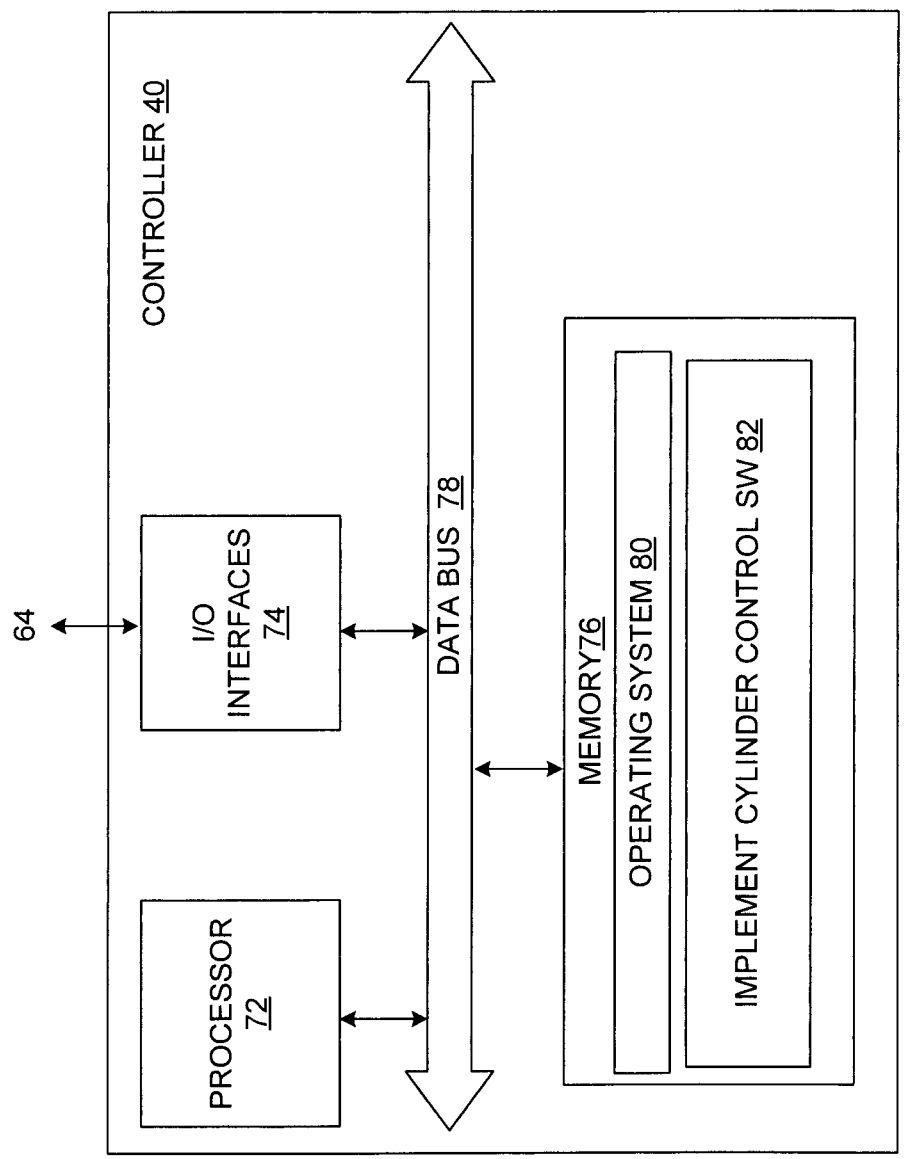
FIG. 5B is a block diagram that illustrates an example controller for the control system of FIG. 5A.
Figure 6:
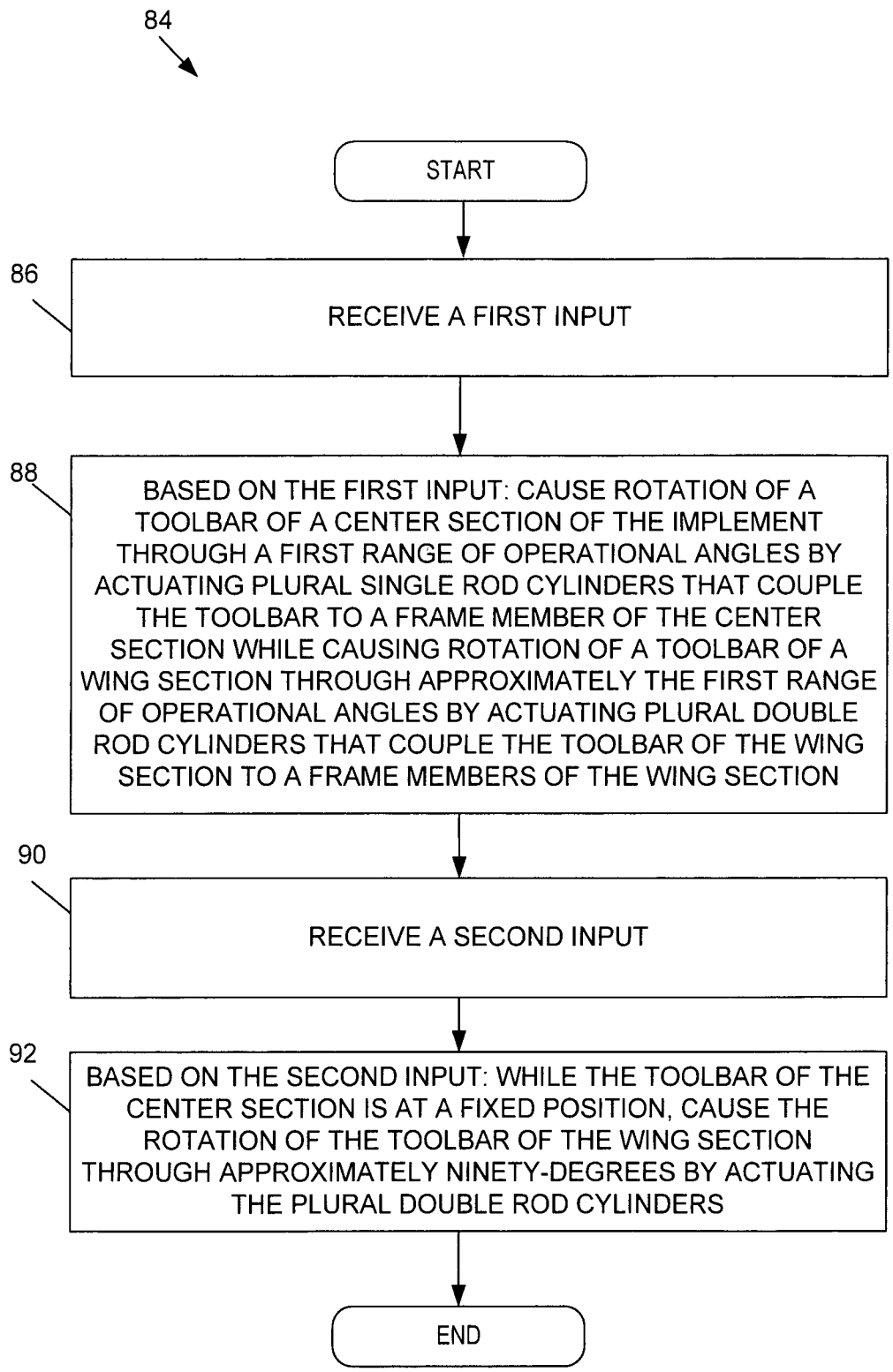
FIG. 6 is a flow diagram that illustrates an embodiment of an example rotating toolbar method.

FIG. 5B further illustrates an example embodiment of the controller 40. One having ordinary skill in the art should appreciate in the context of the present disclosure that the example controller 40 is merely illustrative, and that some embodiments of controllers may comprise fewer or additional components, and/or some of the functionality associated with the various components depicted in FIG. 5B may be combined, or further distributed among additional modules, in some embodiments. It should be appreciated that, though described in the context of residing in the tractor 12 (FIG. 1), in some embodiments, the controller 40, or all or a portion of its corresponding functionality, may be implemented at the implement (e.g., implement 14, FIG. 1) or in a computing device or system located external to the tractor 12 and/or implement. Referring to FIG. 5B, with continued reference to FIG. 5A, the controller 40 or electronic control unit (ECU) is depicted in this example as a computer, but may be embodied as a programmable logic controller (PLC), field programmable gate array (FPGA), application specific integrated circuit (ASIC), among other devices. It should be appreciated that certain well-known components of computers are omitted here to avoid obfuscating relevant features of the controller 40. In one embodiment, the controller 40 comprises one or more processors (also referred to herein as processor units or processing units), such as processor 72, input/output (I/O) interface(s) 74, and memory 76, all coupled to one or more data busses, such as data bus 78. The memory 76 may include any one or a combination of volatile memory elements (random-access memory RAM, such as DRAM, and SRAM, etc.) and nonvolatile memory elements (e.g., ROM, Flash, hard drive, EPROM, EEPROM, CDROM, etc.). The memory 76 may store a native operating system, one or more native applications, emulation systems, or emulated applications for any of a variety of operating systems and/or emulated hardware platforms, emulated operating systems, etc.

In the embodiment depicted in FIG. 5B, the memory 76 comprises an operating system 80 and implement cylinder control software (SW) 82. It should be appreciated that in some embodiments, additional or fewer software modules (e.g., combined functionality) may be deployed in the memory 76 or additional memory. In some embodiments, a separate storage device may be coupled to the data bus 78, such as a persistent memory (e.g., optical, magnetic, and/or semiconductor memory and associated drives).

The implement cylinder control software 82 receives input from the user interface 66 (via the I/O interfaces 74 and network 64). In some embodiments, the input may comprise software or device input, including a GNSS signal (or processed version thereof) comprising coordinate locations that are used by the implement cylinder control software 82 to map the coordinates to identification of certain field features, including headlands or roads leading up to the field (or entrances). Such information may be used by the implement cylinder control software 82 to determine when to automatically rotate the toolbar 44 (FIG. 2A) to one of plurality operational positions depending on the field location. For instance, certain field locations may be mapped to an instruction or command that includes a (toolbar) rotation value and corresponding stroke amount and control valve position. The command may be issued by the implement cylinder control software 82 to one or more controllers 60 of the control valve(s) 58. In embodiments where the input is via operator entry at the user interfaces 66 (or via remote commands), the implement cylinder control software 82 receives the user interface signal and translates the same into a command and issues the command to the controller 60 (or controllers 60) of the control valve(s) 58. The resulting flow changes are communicated to the cylinders in a manner as explained above. In some embodiments, the implement cylinder control software 82 may work in conjunction with the user interfaces 66 to provide feedback of the actions on a display screen (or audibly via speaker), and/or provide an opportunity for acknowledging an impending actuation or an opportunity to intervene.

Execution of the implement cylinder control software 82 may be implemented by the processor 72 under the management and/or control of the operating system 80. The processor 72 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 40.

The I/O interfaces 74 provide one or more interfaces to the network 64 and other networks. In other words, the I/O interfaces 74 may comprise any number of interfaces for the input and output of signals (e.g., analog or digital data) for conveyance of information (e.g., data) over the network 64. The input may comprise input by an operator (local or remote) through the user interfaces 66 and input from signals carrying information from one or more of the components of the control system 62, as explained above.

When certain embodiments of the controller 40 are implemented at least in part with software (including firmware), as depicted in FIG. 5B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 40 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Having described some example embodiments of a rotating toolbar system, it should be appreciated in view of the present disclosure that one embodiment of a rotating toolbar method 84, such as implemented by the implement cylinder control software 82, comprises receiving a first input (86); based on the first input: causing rotation of a toolbar of a center section of the implement through a first range of operational angles by actuating plural single rod cylinders that couple the toolbar to a frame member of the center section while causing rotation of a toolbar of a wing section through approximately the first range of operational angles by actuating plural double rod cylinders that couple the toolbar of the wing section to a frame members of the wing section (88); receiving a second input (90); and based on the second input: while the toolbar of the center section is at a fixed position, causing the rotation of the toolbar of the wing section through approximately ninety-degrees by actuating the plural double rod cylinders (92).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of a rotating toolbar system are merely possible examples of implementations, merely set forth for a clear understanding of the principles of the rotating toolbar system. Many variations and modifications may be made to the above-described embodiment(s) of the rotating toolbar system without departing substantially from the spirit and principles of the disclosure. All such modifications and variations are intended to be included herein within the scope of the disclosure and protected by the following claims.

The invention claimed is:

1. A system, comprising:
a control system;
a center section and a pair of wing sections, each of the sections comprising a pair of parallel frame members pivotably coupled to each other, wherein one of the frame members of the pair of parallel frame members comprises a toolbar; and
a plurality of hydraulic cylinders enabling rotational movement between the parallel frame members, wherein the hydraulic cylinders of the wing sections comprise double rod cylinders and the hydraulic cylinders of the center section comprises single rod cylinders,
the control system configured to cause the double rod cylinders to rotate the toolbars of the wing sections to multiple operational positions and to cause the single rod cylinders to rotate the tool bar of the center section to a subset of the multiple operational positions by changing a respective state of the double rod and single rod cylinders.

2. The system of claim 1, wherein the control system comprises at least one controller and one or more control valves that are coupled to the double rod and single rod cylinders.

3. The system of claim 1, wherein for each of the wing sections, the control system is further configured to cause the double rod cylinders to rotate the toolbar of the wing section to an approximately zero degree angle relative to a frame of the other frame member of the wing section based on a received input.

4. The system of claim 1, wherein for each of the wing sections, the control system is further configured to cause the double rod cylinders to rotate the toolbar of the wing section to an intermediate angle relative to a frame of the other frame member of the wing section based on a received input.

5. The system of claim 1, wherein for each of the wing sections, the control system is further configured to cause the double rod cylinders to rotate the toolbar of the wing section to an approximately ninety-degree angle relative to a frame of the other frame member of the wing section based on a received input.

6. The system of claim 1, wherein for the center section, the control system is further configured to cause the single rod cylinders to rotate the toolbar of the center section to an approximately zero degree angle between the toolbar of the center section and a frame of the other frame member of the center section based on an input.

7. The system of claim 1, wherein for the center section, the control system is further configured to cause the single rod cylinders to rotate the toolbar of the center section to an intermediate angle between the toolbar of the center section and a frame of the other frame member of the center section based on an input.

8. The system of claim 1, wherein the control system is further configured to cause the single rod cylinders to rotate the toolbar of the center section to the subset of operational positions concurrently with causing the double rod cylinders to rotate the toolbars of the wing sections to the corresponding rotations.

9. The system of claim 1, further comprising:
   plural wheels between the pair of frame members, the wheels coupled to the frame member that is parallel to the toolbar; and
   plural row units coupled to the toolbar.

10. A computer-implemented method for operating an implement, comprising:
   at a controller:
      receiving a first input;
      based on the first input:
         causing rotation of a toolbar of a center section of the implement through a first range of operational angles by actuating plural single rod cylinders that couple the toolbar to a frame member of the center section while causing rotation of a toolbar of a wing section through approximately the first range of operational angles by actuating plural double rod cylinders that couple the toolbar of the wing section to a frame members of the wing section;
      receiving a second input; and
      based on the second input:
         while the toolbar of the center section is at a fixed position, causing the rotation of the toolbar of the wing section through approximately ninety-degrees by actuating the plural double rod cylinders.

\* \* \* \* \*